United States Patent [19]

Kaaden

[11] Patent Number: 4,790,742
[45] Date of Patent: Dec. 13, 1988

[54] APPARATUS FOR THE MANUFACTURE OF PLASTIC PARTS BY INJECTION MOLDING OR REACTION INJECTION MOLDING

[76] Inventor: Hans-Heinrich Kaaden, Friedrich-Herschel-Strasse 5., 8000 Munich 80, Fed. Rep. of Germany

[21] Appl. No.: 909,840

[22] Filed: Sep. 19, 1986

Related U.S. Application Data

[63] Continuation-in-part of Ser. No. 865,197, Apr. 1, 1986.

[30] Foreign Application Priority Data

Sep. 26, 1985 [DE] Fed. Rep. of Germany ....... 3534253

[51] Int. Cl.$^4$ .............................................. B29C 45/20
[52] U.S. Cl. ............................... 425/548; 264/328.15; 425/549; 425/569; 425/595
[58] Field of Search ................ 425/588, 549, 567–572, 425/548, 589, 574, 575, 577, 564, 566, 573, DIG. 35, DIG. 221, 595; 264/328.8, 328.14, 328.15, 328.16

[56] References Cited

U.S. PATENT DOCUMENTS

| | | | |
|---|---|---|---|
| 3,091,812 | 6/1963 | Witkowski | 425/588 X |
| 3,281,898 | 11/1966 | Compton | 425/568 X |
| 4,036,405 | 7/1977 | Mombaecher | 425/568 X |

FOREIGN PATENT DOCUMENTS

| | | | |
|---|---|---|---|
| 166030 | 10/1983 | Japan | 425/588 |
| 181624 | 10/1983 | Japan | 425/588 |
| 183231 | 10/1983 | Japan | 425/588 |
| 54840 | 3/1985 | Japan | 264/328.8 |

Primary Examiner—Richard L. Chiesa

[57] ABSTRACT

A cut-off nozzle system is mounted on the melt conduction duct of the center, sectioned mold clamping plate of an injection molding machine, in such a way that in addition to rapid accessibility of the individual parts of the nozzle system, the center, section mold clamping plate can be easily and quickly separated from the associated screw unit as required for the removal of the molded parts from the molds. The nozzle system has a spacing ring with a torpedo as well as a right-angled adapter and a cut-off nozzle, which parts are exchangeably joined with each other to form one rigid unit. With a high-speed clamping device, this unit is fastened on the movable center, sectioned mold clamping plate. For the upward removal of the molded parts, the screw unit is displaced sideways while the cut-off nozzle system remains mounted on the center mold clamping plate.

16 Claims, 2 Drawing Sheets

4,790,742

APPARATUS FOR THE MANUFACTURE OF PLASTIC PARTS BY INJECTION MOLDING OR REACTION INJECTION MOLDING

This is a continuation in part of U.S. Ser. No. 865,197, filed Apr. 1, 1986.

BACKGROUND OF THE INVENTION

The present invention relates to an apparatus for the manufacture of plastic parts from thermoplastic, thermoset and/or elastomer material by injection molding or reaction injection molding. Such apparatus includes a multi-station locking unit of horizontal or vertical configuration designed to hold a number of molds and an injection unit associated therewith for the simultaneous injection of the molds. The apparatus further includes a movable center mold clamping plate sectioned crosswise relative to the locking direction, the two parts being kept together by a high-speed clamping device, and a melt conduction system arranged between the two parts. The melt conduction system has one or a number of separate melt conduction rails, each of which is rigidly clamped on its face side between the sectioned mold clamping plate lengthwise relative to the direction of flow of the melt, and a median centering collar and a widened melt inlet with rounded walls designed to receive the nozzle system arranged on a flange of each melt conduction rail.

The injection molding machine described above is disclosed in my earlier filed application U.S. Ser. No. 865,197 and in my application filed contemporaneously herewith, U.S. Ser. No. 909,836, the disclosures of which are herein incorporated by reference.

The arrangement of one or several separate melt conduction rails between the parts of the center mold clamping plate that is sectioned lengthwise relative to the locking direction assures rapid and uniform injection of the mold with any shape of mold. This design of the center mold clamping plate with the melt conduction rail requires consideration of an appropriate cut-off nozzle system.

SUMMARY OF THE INVENTION

It is, therefore, the object of the present invention to provide an injection molding machine of the type described above with a cut-off nozzle system and mounting therefor on the melt conduction duct of the center, sectioned mold clamping plate in such a way that in addition to rapid accessibility of the individual parts of the nozzle system, the center, sectioned mold clamping plate can be separated from the associated screw unit in the horizontal direction easily and quickly, such separation being required for removing the molded parts from the molds.

The above object is accomplished in accordance with the present invention by providing a nozzle system having a spacing ring with a torpedo, a right-angled adapter and a cut-off nozzle, all of which are exchangeably joined with each other to form one rigid unit, which is centrally mounted on the movable, sectioned center mold clamping plate by means of a high-speed clamping device.

According to another feature of the present invention, horizontally and vertically extending mounting plates are rigidly arranged on the outer side of the adapter so that several cut-off nozzle systems can be connected via the mounting plates with a high-speed clamping device to form one detachable unit with a variable spacing between such systems.

The cut-off nozzle system according to the invention can be locked on the sectioned center mold clamping plate as an inherently rigid unit. For the removal of molded parts upwardly, the screw unit is displaced sideways while the cut-off nozzle system remains mounted on the center mold clamping plate.

Other objects and features of the present invention will become apparent from the following detailed description considered in connection with the accompanying drawing. It is to be understood, however, that the drawing is designed as an illustration only and not as a definition of the limits of the invention.

DESCRIPTION OF THE PREFERRED EMBODIMENTS

Figure 1:
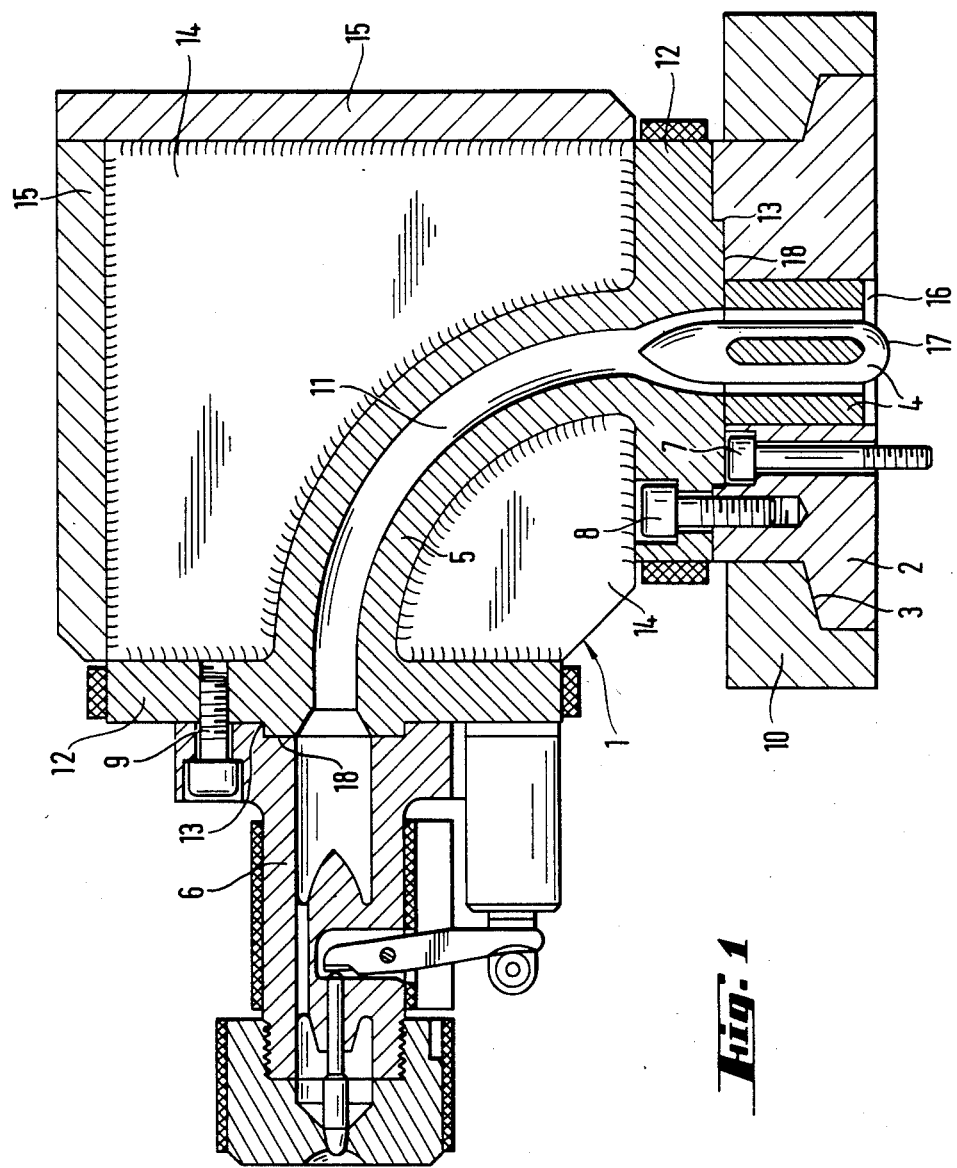
FIG. 1 is a vertical cross-sectional view through a cut-off nozzle system according to the present invention.
Figure 2:
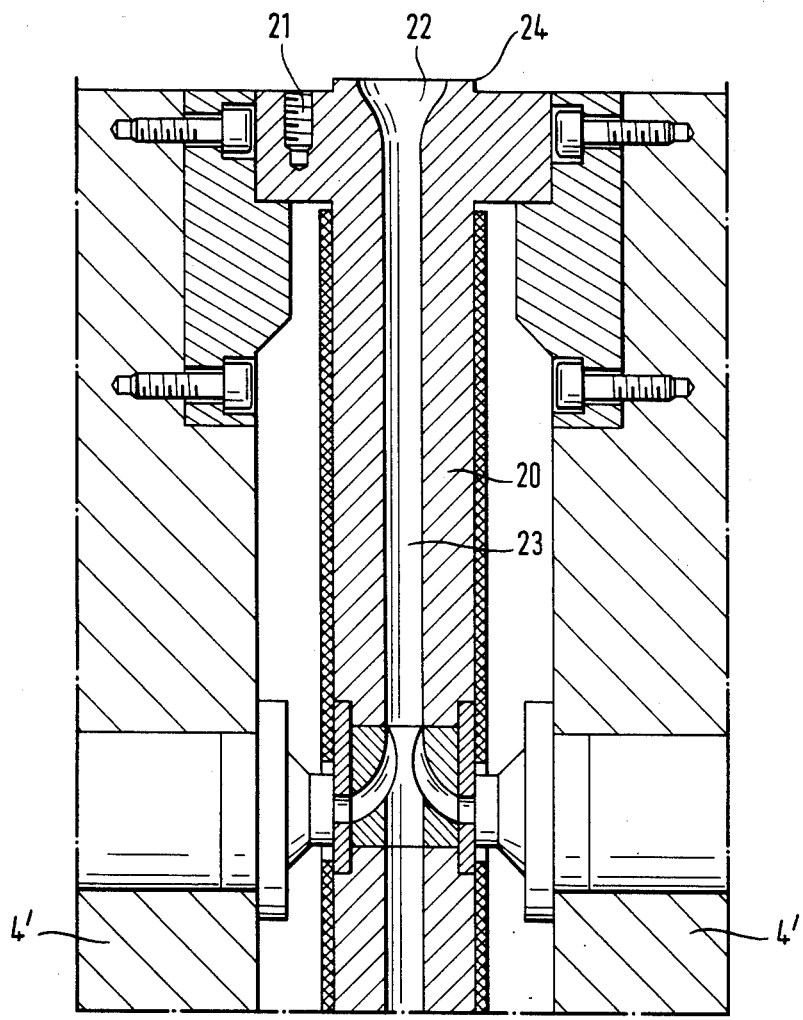
FIG. 2 is a partial vertical cross-sectional view through the melt conduction rail.

In the drawing there is shown an externally heated spacing ring 2 rigidly connected with the melt conduction rail 20 of the center mold clamping plate by means of screws 7. Screws 7 are screwed in threaded bores 21 of a top flange of the melt conduction rail. A torpedo 4, which is separately heatable on the inside, is supported in spacing ring 2 and inserted with its bottom boundary in the matchingly shaped melt inlet 22 which is connected to the melt conduction system 23 of the melt conduction rail (see U.S. Ser. No. 909,836, filed contemporaneously herewith. A recess 16, designed to be positioned on the median centering collar 24 of the melt conduction rail 20, is arranged on the bottom side of spacing ring 2.

A right-angled, externally heated adapter 5 is secured on spacing ring 2 by means of screws 8, which are guided in a mounting flange 12 with a centering collar 13 arranged on the face side of adapter 5. The other face side of adapter 5, also has a mounting flange 12 with a centering collar 13, on which a heatable cut-off nozzle 6 is detachably mounted by means of screws 9. Spacing ring 2 and cut-off nozzle 6 are each provided with a recess 18 matching centering collars 13 of adapter 5.

A curved piece with an interior central melt conduit 11 is supported in adapter 5. The curved piece of adapter 5 is stiffened by stiffening ribs 14 arranged on both sides thereof, whereby stiffening ribs 14 disposed on the outer side of the curved piece are connected with each other by means of horizontally and vertically extending, rigidly arranged mounting plates 15. Because of the design as shown in the drawing and described above, adapter 5 forms an inherently stiff construction. By means of the mounting plates, it is possible to connect a number of cut-off nozzle systems 1 to a detachable unit by means of a high-speed clamping device, whereby the spacing between such cut-off nozzle systems 1 is variable.

All parts of cut-off nozzle system 1 are exchangeably connected with each other in one rigid unit. Such unit is lockably mounted on the movable center, sectioned mold clamping plate 4' and centrally arranged thereon by means of a high-speed clamping device 10, which preferably engages on both sides an outer fastening collar 3 of spacing ring 2.

While only a single embodiment of the present invention has been shown and described, it will be obvious that many changes and modifications may be made thereunto without departing from the spirit and scope of the invention.

What is claimed is:

1. A nozzle system for an apparatus having a plurality of molds and a locking unit used in the manufacture of plastic parts from thermoplastic, thermoset and/or elastomer material by injection molding or reaction injection molding, an injection unit associated with said nozzle system for the simultaneous injection of the molds, a two-part movable center mold clamping plate sectioned crosswise relative to the locking direction, the two parts of said mold clamping plate being kept together by a high-speed clamping device and having a melt conduction system disposed between the two parts, the melt conduction system having one or a number of separate melt conduction rails, each being rigidly clamped on its face side between the sectioned mold clamping plate lengthwise relative to the direction of flow of the melt, and a median centering collar and a widened melt inlet with rounded side walls adapted to receive said nozzle system arranged on a flange of the melt conduction rail, said nozzle system comprising:

a spacing ring with a torpedo, a right-angled adapter and a cut-off nozzle exchangeably joined with each other to form a rigid unit carefully secured on the movable center, sectioned mold clamping plate by said high-speed clamping device.

2. The apparatus according to claim 1, wherein said spacing ring is adapted to be heated externally.

3. The apparatus according to claim 1, wherein a recess is disposed on the bottom side of said spacing ring, said recess being adapted to be placed on the median centering collar of the melt conduction rail.

4. The apparatus according to claim 1, wherein said spacing ring is connected with the melt conduction rail.

5. The apparatus according to claim 4, wherein said spacing ring is secured to said melt conduction rail by screw means.

6. The apparatus according to claim 1, wherein said spacing ring has an outer fastening collar.

7. The apparatus according to claim 1, wherein said torpedo is adapted to be separately heatable on the interior thereof.

8. The apparatus according to claim 1, wherein said torpedo projects from said spacing ring with its rounded bottom part and projects into the melt inlet of the melt conduction rail when connected to the center mold clamping plate.

9. The apparatus according to claim 1, wherein said adapter has a curved piece with a central melt conduit disposed on the inside thereof, and a mounting flange with a centering collar arranged on each face side of said adapter.

10. The apparatus according to claim 9, wherein said curved piece of the adapter has at least one rigidly arranged reinforcing rib on both sides thereof.

11. The apparatus according to claim 10, wherein horizontally and vertically extending mounting plates are rigidly arranged on said at least one reinforcing rib disposed on the outer side of the curved piece.

12. The apparatus according to claim 11, wherein several cut-off nozzle systems are connected to one unit via the mounting plates with a high-speed clamping device.

13. The apparatus according to claim 12, wherein the connection of several cut-off nozzle systems via the mounting plates is detachable and variable with respect to the spacing between such systems.

14. The apparatus according to claim 1, wherein the cut-off nozzle is detachably fastened on the adapter.

15. The apparatus according to claim 1, wherein said cut-off nozzle is heatable.

16. The apparatus according to claim 1, wherein said cut-off nozzle and said spacing ring are each provided with a recess matching the centering collar of said adapter.

* * * * *